June 20, 1933.  C. G. NAYLOR  1,915,029
APPARATUS FOR PRODUCING PIPE
Filed Aug. 31, 1929   6 Sheets-Sheet 1

Inventor:
Carl G. Naylor,

Fig. 3

June 20, 1933.  C. G. NAYLOR  1,915,029
APPARATUS FOR PRODUCING PIPE
Filed Aug. 31, 1929   6 Sheets-Sheet 4

Inventor:
Carl G. Naylor,
By Dyrenforth, Lee, Chritton & Wiles, Attys.

Patented June 20, 1933

1,915,029

UNITED STATES PATENT OFFICE

CARL G. NAYLOR, OF CHICAGO, ILLINOIS, ASSIGNOR TO NAYLOR PIPE COMPANY, OF CHICAGO, ILLINOIS, A CORPORATION OF ILLINOIS

APPARATUS FOR PRODUCING PIPE

Application filed August 31, 1929. Serial No. 389,711.

My invention relates broadly to a method of and apparatus for producing pipe, and more particularly to a method of and apparatus for producing pipe which is formed by winding a strip or ribbon of metal into a series of spirally related convolutions that are welded to each other, the invention having among other objects the production of pipe of the character described in which the welded joint is free from leaks and is adapted to withstand high pressure.

Particular objects of the invention are to provide an improved method of welding; to provide an improved method for producing welded spiral pipe; to provide improved welding apparatus, and to provide improved apparatus for welding spiral pipes.

A preferred form of the invention is embodied in improved apparatus adapted to engage the seam of a previously formed spiral pipe, which apparatus advances the pipe longitudinally and simultaneously rotates it about its axis in such manner that the seam registers with a plurality of welding devices as it advances, the welding devices being adapted to function simultaneously to form a double weld at the seam, which is preferably a lock-seam. In the preferred embodiment of the invention, a folded portion of the lock-seam is welded to the adjacent outer surface of the pipe. In some instances, means is provided for holding the pipe in effective engagement with the means for rotating it.

Many other objects and advantages will become apparent as this description progresses, reference being had to the accompanying drawings, wherein.

It is believed that a complete understanding of my improved method will be had from a description of apparatus whereby it is practiced.

The apparatus shown in the accompanying drawings is particularly adapted to weld spiral pipe which has previously been formed in a machine of the type shown and described in my United States Letters Patent No. 1,288,134 granted December 18, 1918, the pipe being formed from a strip or ribbon of metal which is wrapped around a mandrel to form a series of spirally related convolutions. Adjacent convolutions are secured to each other by a lock-seam which preferably extends the entire length of the pipe.

Figure 8:
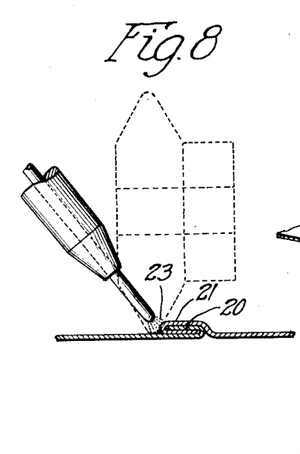
Fig. 8 is a diagrammatic view illustrating the manner in which spiral pipe is welded as it passes through the apparatus shown in Fig. 1.
Figure 9:
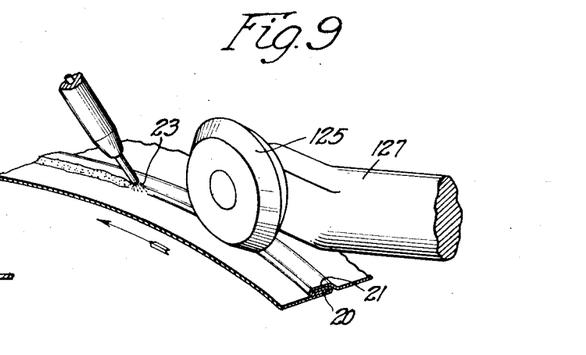
Fig. 9 is a perspective view of a guide roller adapted to keep the spiral pipe in alinement with a welding device.

Referring to Figs. 8 and 9, I have illustrated a preferred lock-seam construction, and it will be noted that the edge of one convolution is bent outwardly and back parallel to itself to provide a tongue 20 which projects into a slot or groove 21 formed by turning the adjacent end of the adjacent convolution inwardly and back parallel to itself. It may be mentioned at this point in the description that my improved apparatus is particularly adapted to weld the folded edge or portion, identified by reference character 23, to the outer surface of the adjacent convolution. In some instances, I prefer to do this welding in a single operation, but I have found it advantageous to make a double weld to insure that the pipe will withstand high pressures without leaking. The double welding is preferably done by having two welding devices operate simultaneously, one being in advance of the other.

Figure 1:
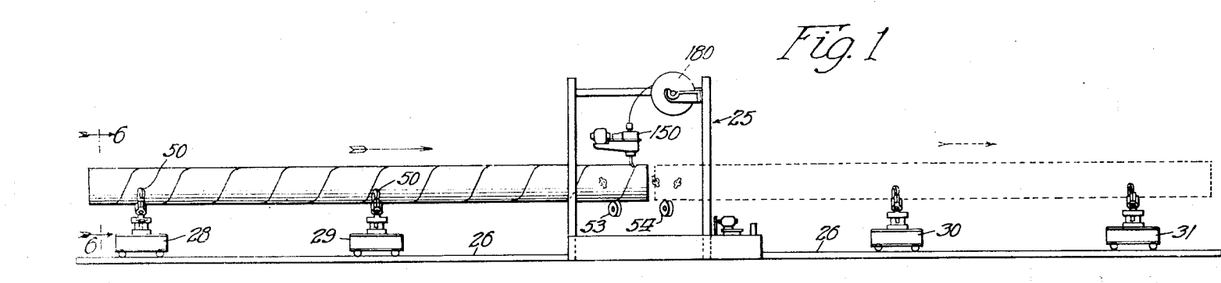
Figure 1 is a diagrammatic side elevation of apparatus which embodies the invention.

Referring now to Fig. 1, the reference character 25 designates generally a frame which holds the pipe advancing and rotating mechanism and also the welding mechanism. Adjacent each end of the frame 25 are rails 26 upon which a plurality of trucks 28, 29, 30 and 31 are mounted. The trucks 28, 29, 30 and 31 are preferably identical in construction and are simply employed to support the pipe as it travels through the mechanism in the frame 25.

Figure 5:
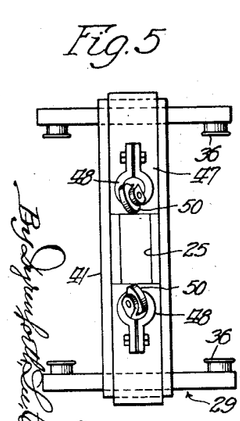
Fig. 5 is a plan elevation of one of a plurality of pipe guiding devices shown in Fig. 1.
Figure 6:
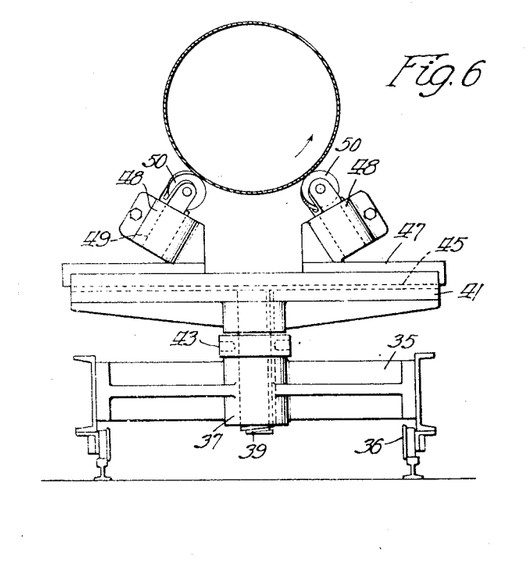
Fig. 6 is a front elevation of the guiding device shown in Fig. 5.

As best shown in Figs. 5 and 6, each truck comprises a frame 35 provided with wheels 36 adapted to travel upon the rails 26. Splined in a boss 37 formed in the frame 35 is a screw-threaded rod 39 to the upper end of which a head 41 is rigidly secured. Interposed between the head 41 and the frame 35 and screw-threaded upon rod 39 is a nut 43 which may be engaged by a suitable tool (not shown) and rotated to raise or lower the head 41. Slidably journaled in ways 45 formed in the head 41 are bracket members 47 provided with split bosses 48 in which posts 49 are clamped. It is obvious that the posts 49 are adjustably mounted in the split bosses 48. The posts 49 are bifurcated at their upper ends and rotatably journal rollers 50 which engage the spiral pipe while it is being advanced through the frame 25. It will be noted that the rollers 50 are disposed at angles which correspond with the direction in which the surface of the pipe travels while it is being advanced.

Figure 2:
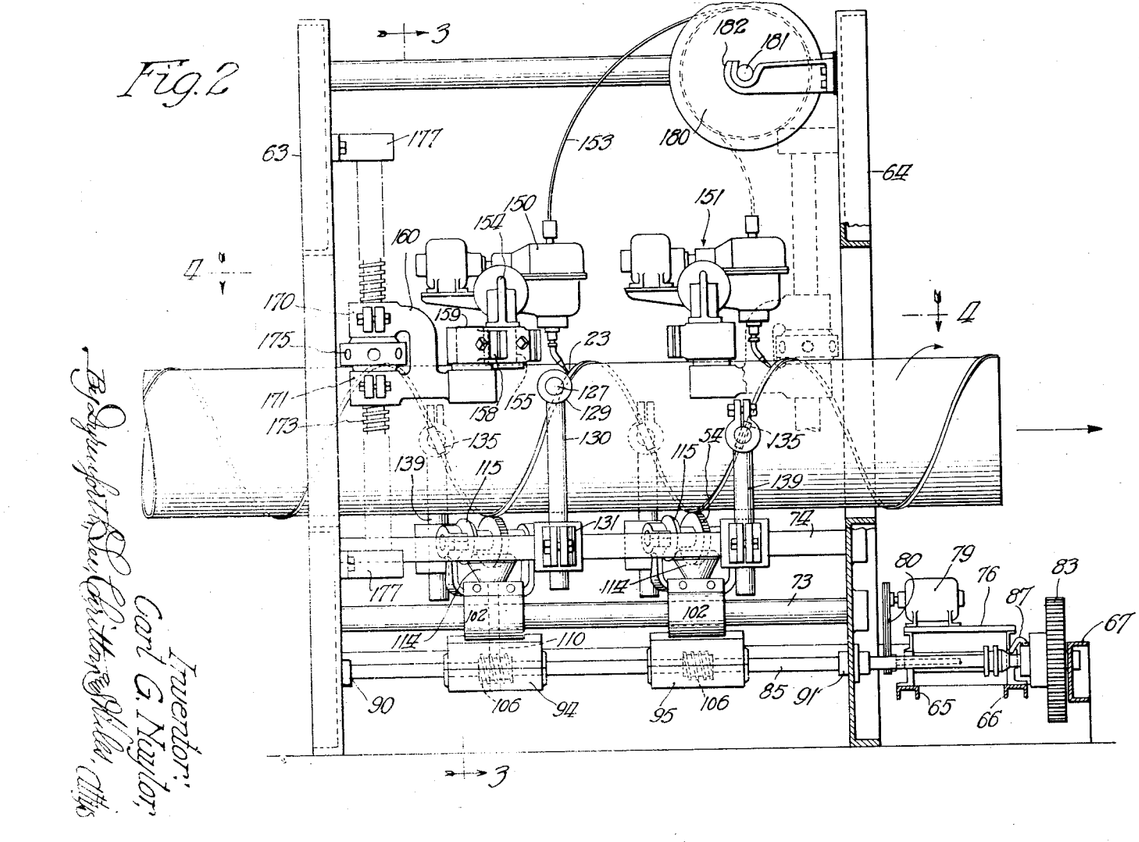
Fig. 2 is an enlarged side elevation, partly in section, of a portion of the apparatus shown in Fig. 1.
Figure 3:
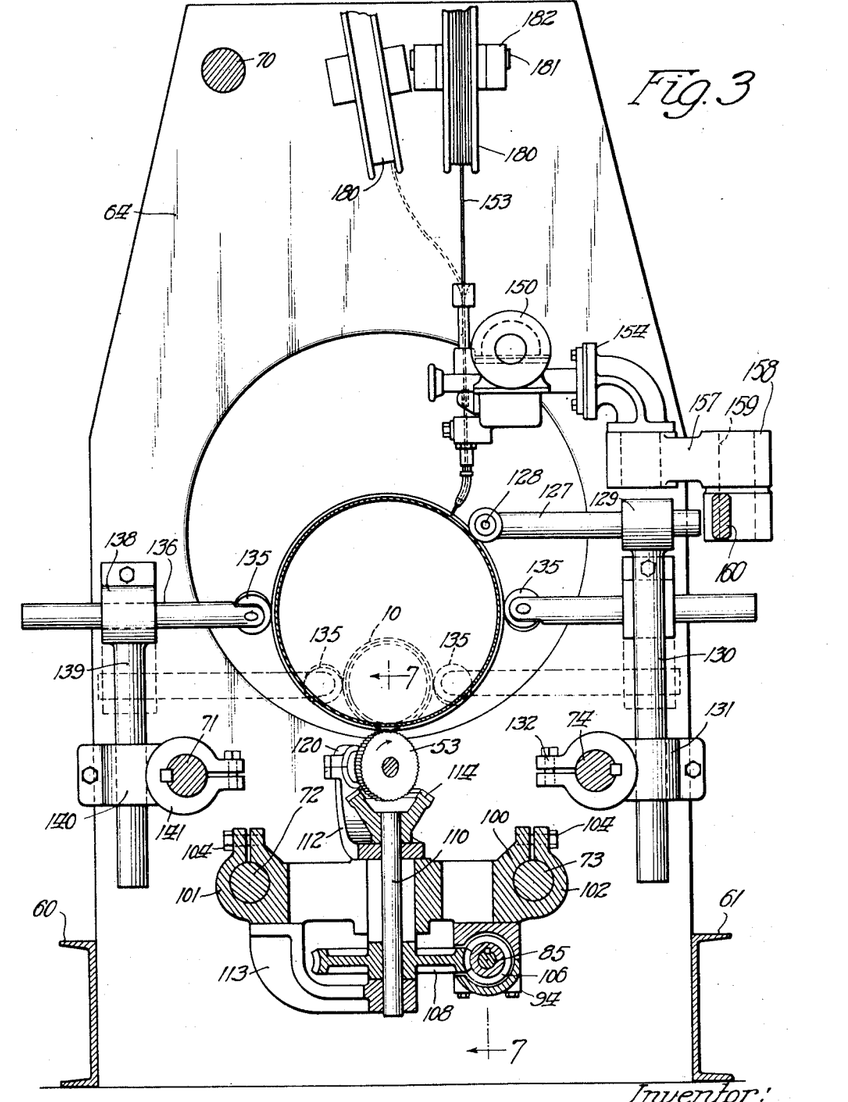
Fig. 3 is a section taken on line 3—3 of Fig. 2.

As illustrated diagrammatically in Fig. 1, and more in detail in Figs. 2 and 3, a plurality of driving rollers 53 and 54 are preferably provided for rotating the pipe and advancing it, the rollers being preferably knurled to insure effective engagement with the pipe. When the pipe occupies the position wherein it is shown in full lines in Fig. 1 with respect to the frame 25, it does not engage the rollers 50 associated with the truck 29 as these rollers are preferably brought into adjusted position wherein they will not engage the pipe until it passes out of engagement with the rollers 50 associated with the truck 28 and drops upon the rollers of the truck 29. The rollers 50 of the truck 30 are preferably adjusted in the same manner as the rollers 50 of the truck 29, and this insures that the pipe will rest upon the driving rollers 53 and 54 during the time it is being advanced through the welding apparatus.

Figure 4:
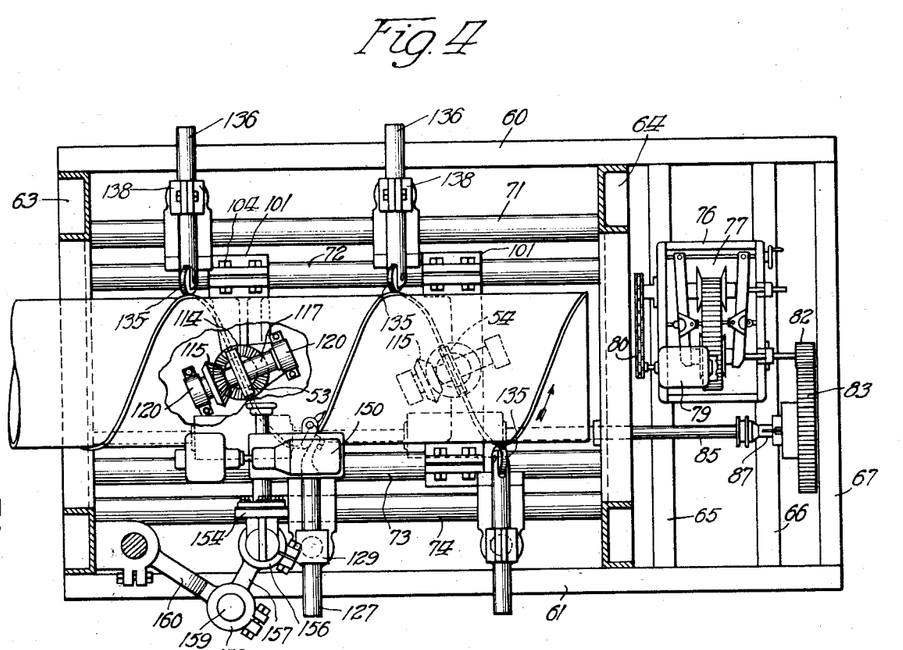
Fig. 4 is a section taken on line 4—4 of Fig. 2.

Referring now to Figs. 2, 3 and 4, it will be noted that the frame 25 preferably comprises longitudinally extending channel members 60 and 61, to which transversely extending frame members 63 and 64 are secured. In addition to the frame members 63 and 64, channel members 65, 66 and 67 tie the channel members 60 and 61 to each other. The frame members 63 and 64 are rigidly secured to each other by a plurality of tie-rods 70, 71, 72, 73 and 74.

Carried by the channel members 66 and 67 is the frame 76 of a speed-changing device, which is designated generally by reference character 77. Any suitable speed-changing device may be employed, and the details of the one illustrated in the drawings do not form a part of this invention. Mounted upon the frame 76 is a motor 79 which is operatively connected by a sprocket chain 80 to the speed-changing device 77, the speed-changing device being arranged to drive a pinion 82 which meshes with a gear 83 mounted upon one end of a shaft 85 extending longitudinally of the frame 25. A clutch mechanism 87 provides means whereby the gear 83 may be operatively connected to shaft 85 to drive it and suitable levers (not shown) are provided for manual control of the clutch mechanism 87.

The shaft 85 is preferably journaled in bearings 90 and 91 mounted upon the frame members 63 and 64, respectively, the shaft being also journaled in bearing blocks 94 and 95 which are rigidly secured to bracket members 100 carried by the tie-rods 72 and 73. Thus, the bracket members 100 are provided with split bosses 101 and 102 which are slidably journaled upon the tie-rods 72 and 73 and may be clamped thereto by manipulating bolts 104.

The bearing blocks 94 and 95 are preferably hollow to provide chambers for a plurality of worms 106 splined upon the shaft 85, one worm 106 being disposed in the bearing block 94 and the other worm being disposed in the block 95. As best illustrated in Fig. 3, each worm 106 meshes with a worm-gear 108 secured to a vertically disposed shaft 110 which is rotatably journaled in bracket members 112 and 113 carried by the associated bracket member 100. A bevel gear 114 secured to the upper end of each shaft 110 meshes with a bevel gear 115 secured to a horizontally disposed shaft 117, the horizontally disposed shaft 117 being journaled in bearing 120 formed upon the associated bracket member 112. The driving roller 53 is rigidly secured to one of the shafts 117 and the driving roller 54 is rigidly secured to the other. Obviously, when the motor 79 is in operation and the gearing 83 is effectively coupled to the shaft 85, the driving rollers will be rotated and will rotate the pipe to advance it through the apparatus.

Figure 10:
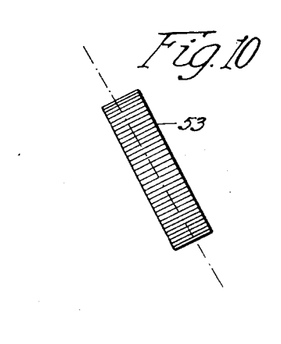
Fig. 10 is a diagrammatic view illustrating the manner in which the spiral pipe is rotated and simultaneously advanced longitudinally through the apparatus.

As illustrated diagrammatically in Fig. 10, each of the driving rollers is preferably set at such an angle with respect to the direction or angle at which the spiral joint of the pipe travels so that the driving rollers tend to retard the pipe to some extent. The purpose of this construction is that the rollers then hold the outer folded edge or portion of the lock-seam against a guide roller 125 which is shown in perspective in Fig. 9. In Fig. 10, the driving roller 53 is shown in full lines as it appears from above, and in dot and dash lines the lock-seam of a pipe is illustrated diagrammatically. The direction of travel is indicated by the arrow. In practice, the driving roller 53 tends to retard the longitudinal travel of the pipe as determined by the lead in the seam, but the guide roller 125 insures that this lead will control the advance of the pipe through the apparatus.

The guide roller 125 is preferably provided with a V-shaped periphery, but it is readily understood that its periphery can be modified to meet any alteration in the shape of the lock-seam. To carry the guide roller 125, I preferably provide a bent post 127 which carries a pin 128 upon which the guide roller is journaled. The post 127 is adjustably secured in a split boss 129 provided upon the upper end of a vertically extending post 130 which is itself adjustably secured in a split boss 131 formed integral with a split boss 132 clamped and splined upon the tie-rod 74 (see Fig. 3).

To hold the pipe in position above the driving rollers 53 and 54, I preferably provide a plurality of guide rollers 135 carried upon posts 136 which are adjustably secured in split bosses 138 provided upon the upper ends of posts 139 which are clamped in split bosses 140 formed integral with split bosses 141, the split bosses 141 being splined and clamped to the tie-rod 71 and 74. The guide rollers 135 are preferably provided with smooth peripheries and in practice I preferably adjust the positions thereof so that there is some clearance between them and the pipe when the longitudinal axis of the pipe is in the same plane as the axis of the shafts 110.

It will be noted that the rollers 135 engage the lock-seam of the pipe and that they are disposed at angles which correspond substantially with the direction or angle at which the lock-seam advances through the apparatus. The aforementioned rollers 50 associated with the trucks 28, 29, 30 and 31 preferably engage the pipe intermediate the convolutions of the lock-seam.

As set forth above, I preferably provide a plurality of welding devices 150 and 151 which are preferably of the metallic electrode welding type. The details of the welding devices do not form a part of this invention, but, briefly, each comprises means for automatically feeding a welding wire 153 to the arc and each preferably comprises automatic means for maintaining a constant arc length and a constant arc voltage. Similar mechanism is provided for mounting each of the welding devices in the frame 25 and, therefore, it will only be necessary to show and describe fully the mechanism shown in the welding device 150.

The welding device 150 is carried by a bracket 154 provided with an integral stud-shaft 155 adjustably secured in a split boss 156 provided upon a bracket member 157 which has another split boss 158 adjustably secured to a stud-shaft 159 formed integral with a bracket member 160 having bifurcated arms 170 and 171 slidably and rotatably journaled upon a screw-threaded rod 173. It will be noted that the bifurcations 170 and 171 of bracket member 160 comprise split bosses that may be clamped upon the rod 160 to hold the bracket member 160 in any adjusted position.

Intermediate the bifurcations 170 and 171 is a nut 175 screw-threaded upon the rod 173 and adapted to be engaged by a suitable tool (not shown) to rotate it so that it may be raised or lowered upon the rod 173 to raise or lower the bracket member 160, and thus raise or lower the welding device 150. The ends of the rod 173 are rigidly secured in brackets 177 projecting from the frame member 63.

The wire 153 of the welding devices 150 and 151 is preferably fed to the welding devices from spools 180 rotatably journaled upon a shaft 181 carried by brackets 182 which project and are insulated from the frame 64.

A feature of the improved apparatus illustrated in Figs. 1 to 10, inclusive, is that pipes of various diameters can be handled thereby. Thus, the welding devices 150 and 151 may be brought into a plurality of adjusted positions to register with the lock-seams of spiral pipes of various sizes, and the driving rollers 53 and 54 may be displaced longitudinally of the apparatus to have them register accurately with the lock-seam. It is for this purpose that the bracket members 100 may be clamped in any desired position upon tie-rods 72 and 73 and displacement of the bracket members 100 is accomplished by like displacement of the worms.

Figure 7:
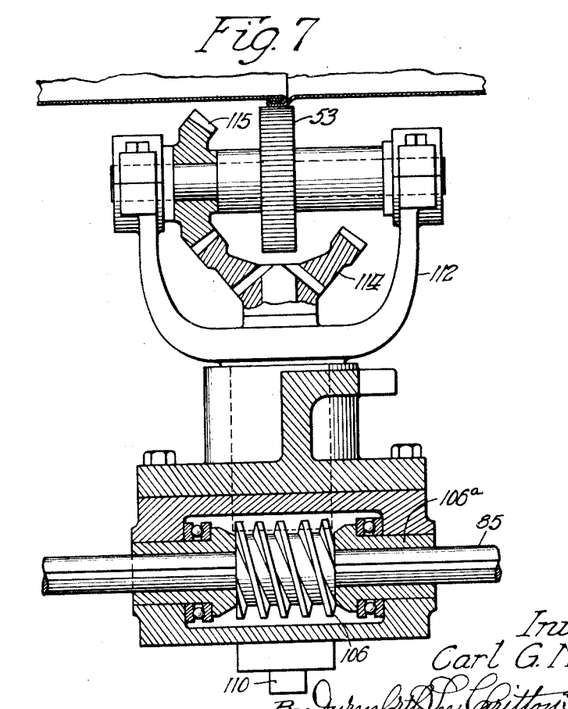
Fig. 7 is a section taken on line 7—7 of Fig. 3.

Referring to Fig. 7, I have illustrated how each worm 106 is positioned between bushings 106a rotatably journaled in the associated bearing block 94 or 95, the construction being such that when the bearing block is displaced as a result of displacement of the associated bracket member 100, the worm will be displaced an equal distance. Also, as set forth above, the split bosses 132 and 141 are splined to the tie-rods 71 and 74 so that they may be displaced longitudinally thereof. In Fig. 3, I have illustrated in dotted lines the manner in which the guide rollers 135 may be brought into adjusted positions to center a spiral pipe of relatively small diameter. Obviously, the guide roller 125 may also be brought into the proper position for pipe of any diameter within the capacity of the apparatus.

The operation of the above described apparatus is substantially as follows: Assuming that the apparatus has been adjusted to correspond to the diameter of the pipe which is to be welded, the pipe is delivered to the left hand end of the apparatus, as illustrated in Fig. 1, and it is advanced in the direction of the arrows, the pipe being simultaneously rotated. The forward end of the pipe is pushed or brought into engagement with the driving roller 53 and when the pipe is in this position it rests upon that driving roller and the rollers 50 of the drum 28. The motor 79 is now set in operation and the clutch mechanism 87 is adjusted to drive the shaft 85 whereupon the roller 53 rotates the pipe and cooperates with the guide roller 125 to advance the pipe longitudinally. The welding device 150 is first set into operation and as soon as the pipe has advanced sufficiently to have the lock-seam thereof register with the welding device 151, it is set into operation. The welding device 150 performs the initial weld, but in practice I have found that this weld is often defective in that holes are left therein through which the contents of the pipe may escape if a relatively high pressure obtains therein. The defective weld is generally caused by scale upon the pipe which prevents effective contact between the parts of the lock-seam, but if an initial weld is first made this fault is overcome and the second weld is substantially perfect. It is to insure that the weld will be substantially gas-tight under high pressures that I prefer to form a double weld, and I find it advantageous to do both welding operations at the same time.

After the pipe has been advanced sufficiently to leave the rollers 50 of the truck 28, it drops down upon the rollers 50 of the truck 29 but still remains in engagement with the driving rollers 53 and 54. The trucks are preferably adjusted so that when the pipe leaves the rollers 50 of the truck 29 they immediately ride upon the rollers 50 of the truck 30 and when the pipe engages the rollers 50 of the truck 31, it is raised above the rollers 50 of the truck 30.

Figure 11:
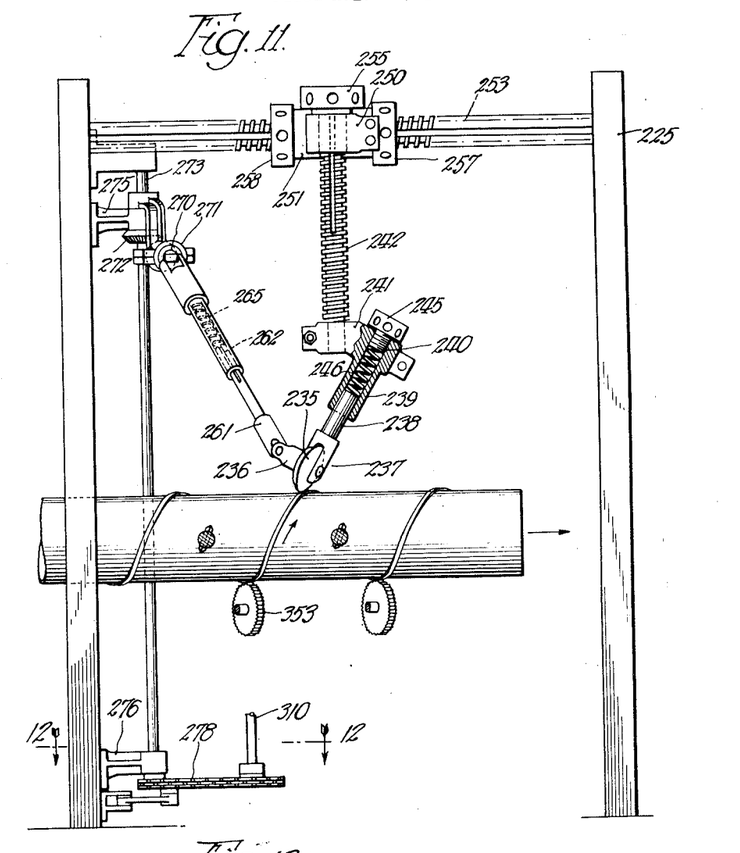
Fig. 11 is a fragmentary side elevation, partly in section, of apparatus embodying another form of the invention.
Figure 12:
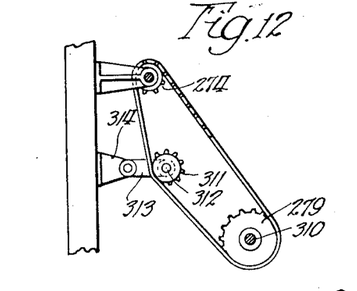
Fig. 12 is a section taken on line 12—12 of Fig. 11.

Referring now to Figs. 11 and 12, wherein I have illustrated another form of the invention, reference character 225 designates a frame which is preferably substantially identical with the above described frame 25 and preferably holds and supports the same mechanism as the frame 25 with the exception that means is provided for holding the pipe in effective engagement with the driving rollers 53 and 54 when the weight of the pipe is insufficient to hold it in effective engagement with the driving rollers. The means preferably comprises a driven roller 235 fixed to a shaft 236 journaled in a bifurcated head 237 formed on the end of a rod 238 which is adapted to telescope into a sleeve 239 clamped in a split boss 240 formed integral with a split boss 241, the split boss 241 being clamped upon the lower end of a screw-threaded rod 242. Disposed in the sleeve 239 and interposed between the rod 238 and a bolt member 245 screw-threaded in the sleeve, is a spring 246 which urges the guide roller 235 against the spiral pipe being advanced through the apparatus. Obviously, the bolt member 245 may be manipulated to adjust the tension of the spring 246.

The screw-threaded rod 242 is splined in a split boss 250 preferably formed integral with a sleeve 251 splined upon a screw-threaded shaft 253 rotatably journaled in the frame 235. A nut 255 screw-threaded upon rod 242 may be manipulated to raise or lower the rod and thus bring the driven roller 235 into adjusted position to correspond with the diameters of the pipes handled by the apparatus. Nuts 257 and 258 screw-threaded upon the shaft 253 may be manipulated to displace the sleeve 251 and the mechanism carried by it including the driven roller 235.

The shaft 236 is connected by a universal joint to a shaft 261 which telescopes into a hollow shaft 262 and is splined thereto. A spring 265 disposed in the hollow shaft 262 bears against one end of the shaft 261 and its function is to urge the driven roller 235 against the lock-seam of the pipe. The hollow shaft 262 is connected by a universal joint to a shaft 270 upon which is secured a bevel gear 271, the bevel gear 271 being arranged to mesh with a bevel gear 272 fixed to a vertically disposed shaft 273 which is provided with a sprocket 274 at its lower end. The shaft 273 is journaled in brackets 275 and 276 rigidly secured to the frame 225.

Any suitable means may be provided for driving the shaft 273, but I preferably employ a sprocket chain 278 for operatively connecting the sprocket 274 with a sprocket 279 fixed to a shaft 310 which corresponds to the shaft 110, shown in Fig. 3, and forms part of the mechanism to drive a roller 353, the roller 353 being provided with a knurled periphery adapted to engage the pipe to advance and rotate it. To compensate for displacement of the shaft 310 relative to the shaft 273, I provide an idler sprocket 311, journaled upon a pin 312 carried by an arm 313 which is pivoted to a bracket 314, the bracket 314 being rigidly secured to the frame 225.

The operation of the apparatus illustrated in Figs. 11 and 12 is substantially as follows: Assuming that the apparatus is in operation to weld the lock-seam of a spiral pipe being advanced through it, it is obvious that the shaft will drive the shaft 273 through the medium of the sprocket chain 278, and this rotation of the shaft 273 will be transmitted to the roller 235 which will aid the driving rollers to rotate the pipe. However, as set forth above, the primary function of the apparatus illustrated in Figs. 11 and 12 is to make the drive positive in the event the pipe is so light that it does not remain in effective engagement with the drive rollers. On pipes of relatively large diameters it is generally not necessary to force the pipe down upon the driving rollers.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I claim as new is:

1. Apparatus for welding the spiral convolutions of a spiral pipe to each other, which apparatus comprises a driven roller frictionally engaging the pipe for rotating and advancing it longitudinally at a speed less than that determined by the lead of said convolutions, a roller engaging the pipe and causing it to advance at a speed corresponding to the lead of said convolutions, means for holding said rollers in engagement with said pipe, and means for welding said spiral convolutions to each other while the pipe is being rotated and advanced.

2. Apparatus for welding a spiral lock-seam joining the spiral convolutions of a spiral pipe to each other, which apparatus comprises a frame, a driven roller mounted in the frame and engaging the pipe to rotate it and advance it longitudinally at a speed less than that determined by the lead of said convolutions, a guide roller mounted in said frame and engaging said lock-seam to cause the pipe to advance at a rate determined by the lead in the lock seam, and means for welding said lock-seam.

3. Apparatus for welding a spiral lock-seam provided in a spiral pipe, which apparatus comprises a frame, a driven roller mounted in the frame and engaging said lock-seam to rotate the pipe and to advance it longitudinally by the lead of said lock-seam, said driven roller being positioned to retard the advancing of said pipe as determined by the lead in said spiral lock-seam, a guide roller engageable with said lock-seam for insuring the advance of the pipe at a rate determined by the lead in said spiral lock-seam, means for mounting said guide-roller in said frame, and means for welding said lock-seam.

4. Apparatus for welding a spiral lock seam formed in the spiral pipe, which apparatus comprises a frame, a plurality of spaced driven rollers engaging said pipe to rotate it and to advance it longitudinally, means for rotatably journaling said rollers in said frame, means for mounting said rollers in the frame and for bringing them into a plurality of adjusted positions with respect to each other longitudinally of said frame, and means alined with said lock-seam for welding it.

5. Apparatus for welding a spiral lock-seam formed in a spiral pipe which apparatus comprises a frame, a plurality of spaced driven rollers engaging said lock-seam to rotate the pipe and to advance it longitudinally, means for mounting said rollers in said frame, said mounting means including means whereby said driven rollers may be adjusted with respect to each other longitudinally of said frame, one of said driven rollers being positioned to retard the advance of said pipe as determined by the lead in said spiral lock-seam, a guide roller mounted in the frame and engaging said lock-seam to cause the pipe to advance longitudinally at a rate determined by the lead in said spiral lock-seam, and means for welding said lock-seam, while the pipe is being advanced.

6. Apparatus for welding a spiral lock-seam provided in a spiral pipe, which apparatus comprises a frame, a driven roller engaging said lock-seam to rotate the pipe and to advance it longitudinally, means for rotatably journaling said driven roller in said frame, means carried by the frame and engaging said lock-seam for causing the pipe to advance longitudinally at a rate determined by the lead in said lock-seam, and means for welding said lock-seam while the the pipe is being advanced.

7. Apparatus for welding a spiral lock-seam provided in a spiral pipe, which apparatus comprises a frame, a plurality of spaced driven rollers engaging said lock-seam to rotate the pipe and advance it longitudinally, means for rotatably journaling said driven rollers in said frame, the last mentioned means including means whereby said rollers may be brought into a plurality of adjusted positions with respect to each other longitudinally of said pipe, a guide roller engaging said lock-seam to insure the advance of the pipe at a rate determined by the lead in said lock-seam, means for rotatably journaling the guide roller in said frame, and a welding device for welding said lock-seam while the pipe is being advanced.

8. Apparatus for welding a lock-seam which joins the spiral convolutions of a spiral pipe to each other, which apparatus comprises a frame, a driven roller engaging the pipe for rotating it and advancing it longitudinally, means carried by said frame for journaling said roller to rotate in a plane at an angle to the direction said seam advances, a roller journalled in said frame and engaging said pipe for causing the said pipe to advance at a rate determined by the lead in said lock-seam, and means for welding said seam.

9. Apparatus for welding the spiral convolutions of a spiral pipe to each other, which apparatus comprises a frame, a roller journaled in said frame for supporting and rotating said pipe, said roller being positioned to advance said pipe as it rotates the pipe, means for driving said roller, and means carried by the frame and engaging said pipe to cause it to advance at a speed determined by the lead of the spiral convolutions thereof.

10. Apparatus for welding a spiral lock-seam provided in a spiral pipe and projecting from the outer side thereof, which apparatus comprises means rotating said pipe and simultaneously advancing it along its longitudinal axis, said means including a roller engaging a side edge of said spiral lock-seam and causing said pipe to advance longitudinally at a rate determined by the lead in said lock-seam, and means for welding said lock-seam while the pipe is being advanced.

In testimony whereof, I have hereunto set my hand and affixed my seal, this 12th day of June, 1929.

CARL G. NAYLOR.